Nov. 24, 1970 D. L. REHNSTRÖM Re. 26,992

HYDRAULICALLY OPERATED DEVICE FOR CUTTING TREES, LOGS AND THE LIKE

Original Filed May 14, 1964 2 Sheets-Sheet 1

INVENTOR:
DICK LENNART REHNSTRÖM
Jacobi & Davidson
ATTORNEYS.

INVENTOR:
DICK LENNART REHNSTRÖM
Jacobi & Davidson
ATTORNEYS.

United States Patent Office

Re. 26,992
Reissued Nov. 24, 1970

26,992

HYDRAULICALLY OPERATED DEVICE FOR CUTTING TREES, LOGS AND THE LIKE

Dick L. Rehnström, Skelleftea, Sweden, assignor, by mesne assignments, of one-third each to Canadian International Paper Company, and Quebec North Shore Paper Company, both of Montreal, Quebec, and Abitibi St. Anne Paper Ltd., Beaupre, Quebec, Canada, all corporations of Quebec, Canada Original No. 3,270,787, dated Sept. 6, 1966, Ser. No. 367,922, May 14, 1964. Application for reissue Sept. 4, 1968, Ser. No. 760,392
Claims priority, application Sweden, May 16, 1963, 5,431/63
Int. Cl. A01g *23/08*
U.S. Cl. 144—34 20 Claims

Matter enclosed in heavy brackets [ ] appears in the original patent but forms no part of this reissue specification; matter printed in italics indicates the additions made by reissue.

*ABSTRACT OF THE DISCLOSURE*

*A tree shear including at least one shear blade mounted on a frame in a link system which includes at least two link members each pivotally connected to the shear blade and the frame and having the pivotal connections so located, the cutting edge of the cutting member follows a path of compound motion during movement of the cutting member relative to the frame toward and away from an abutment thereon respectively to sever and receive a tree. The shear is suspended from a boom at its approximate center of gravity with the shear blade being generally in a horizontal plane for severing a standing tree and the boom from which it is suspended is mounted on a mobile vehicle for slewing about a vertical axis.*

The present invention relates to [an] apparatus for cutting tees, logs and the like [and comprising] *which includes* at least one cutting member *mounted on a frame and* [which is] movable *relative thereto upon actuation of power means such as a hydraulic cylinder. Devices of this nature have a jaw which selectively opens and closes by movement of the cutting member, upon actuation of the hydraulic motor, respectively to receive an article to be severed and sever such article. The jaw is an open mouth type whereby relative movement of the apparatus and article to be severed is in a direction normal to the length of the article during insertion of the same into the jaw* [when actuated upon by a hydraulic cylinder. The] Prior art devices of the kind just defined have not found any widespread use due to the fact that they exhibit some very disadvantageous characteristics. Firstly, their power consumption is disproportionately great and, secondly, the operational result has suffered from the drawback that the ends of the logs or the corresponding workpieces have been so crushed that the adjacent portions of the logs could in any case not be sawn into boards.

The main object of this invention is to eliminate both the above disadvantages by providing *a tree severing device having at least one shear blade cutting member and being of the open mouth type* [an apparatus which is] designed in such a way that during a cutting operation each point on the *cutting edge of the* blade of the cutting member carries out a movement which has a component in the longitudinal direction of said [blade] *cutting edge.*

Two embodiments of the invention will now be described in greater detail, reference being made to the accompanying drawings[.].

Figure 1:
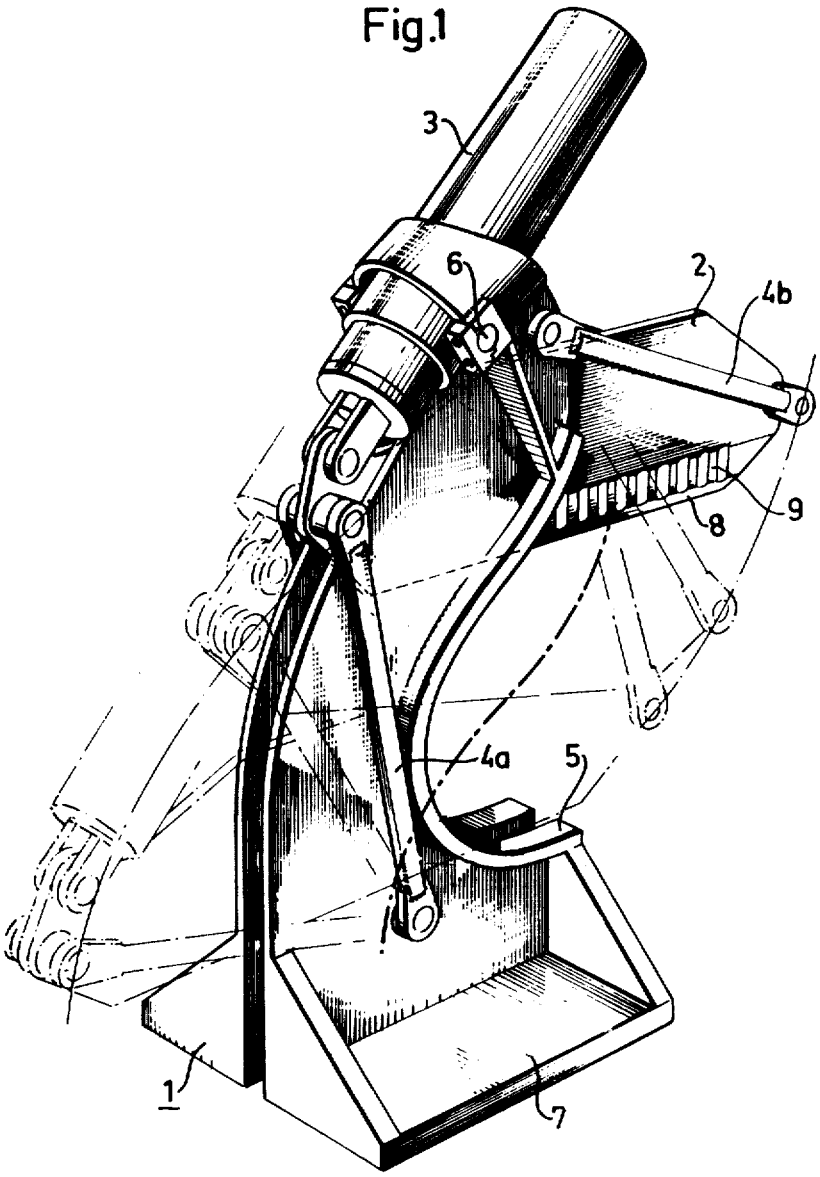
FIG. 1 shows an apparatus suitable for stationary use, e.g. out on the field or in saw-mills and similar plants.

The fundamental design of the apparatus appears most clearly from FIG. 1. As shown in that figure, the apparatus consists of four main portions, namely a frame 1, a cutting member 2, a hydraulic cylinder 3 and two pairs of links [4,] *4a and 4b* which form a link system. Frame 1 consists of two symmetric halves which are interconnected at their top and bottom ends only whereas the remaining portions are spaced by such a distance that the cutting member[s] 2 can freely pass therebetween. The side of the frame facing the cutting member is shaped like a substantially semi-circular support surface 5 for the log or other workpiece which is to be cut. The hydraulic cylinder 3 is, by means of pivots 6, connected to the frame 1 so that it can swing somewhat in the plane of movement of the cutting member 2. The latter is shown in its one end position, where the *jaw of the* apparatus is *open* ready to receive a log. [However, the thin] *Thin* dash-dot lines *in FIG. 1* show the cutting member [also] in its opposite end position and, in addition thereto, links *4a and* 4b, in an intermediary position. It appears from the drawing that during its movement from the starting position to the final position the cutting member will move substantially parallel to itself and also, that each point *on the cutting edge* of the blade of the cutting member will carry out a movement having a component in the longitudinal direction of said [blade] *cutting edge.* The significance thereof will be commented upon below.

The link system comprises *a pair of links 4a and a pair of links 4b* [two link pairs, to wit 4*a* and 4*b*]. Each of links 4a has its top end pivotably connected to the inner end of cutting member 2 and its bottom end pivotably connected to frame 1 near the foot 7 thereof. In contrast thereto, each of links 4b has its top end pivotably connected to frame 1 and its bottom end pivoted connected to the outer end of cutting member 2. Adjacent the pivot between links 4a and cutting member 2 the piston of the hydraulic cylinder 3 is pivotably connected to said cutting member. Although this does not appear from the perspective view in FIG. 1, links 4b are somewhat longer than links 4a.

The above description of the structural nature of the apparatus will also suffice to convey an understanding of its function. However, as a matter of explanation it should be added that thanks to the fact that the cutting member is not only moved at right angles to the workpiece but at the same time also displaced in its own plane, a very considerable reduction of the friction between the cutting member and the workpiece is attained. That reduction does in turn make possible a corresponding decrease of the total power that the hydraulic cylinder 3 has to develop. The explanation is that the operational lines of the friction force and the cutting force do no longer coincide but form a certain angle to each other so that the corresponding forces are not added algebraically but geometrically. The just-mentioned advantageous effect can be still more amplified by the choice of a suitable shape for the [blade] *cutting edge* 8 of the cutting member 2 and of the portion 9 located immediately [inside the blade] *behind the cutting edge.* As shown on the drawing [that] portion *9* is provided with a number of evenly spaced grooves *disposed* perpendicular to the *cutting* edge [of the blade]. These grooves cause a reduction of the friction power by affording a space into which resin and the like can penetrate.

Figure 2:
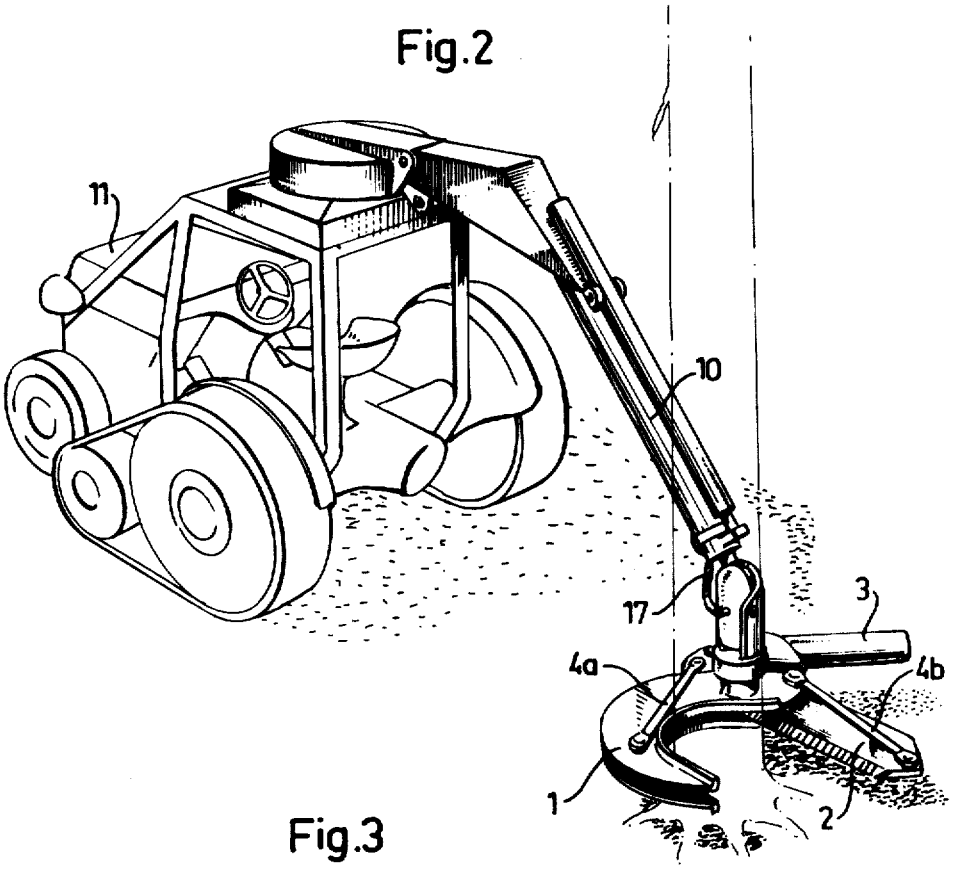
FIG. 2 shows an apparatus mounted on a vehicle, namely at the outer end of a crane beam caried by a semi-band tractor.

According to the embodiment shown in FIG. 2 the apparatus is mounted on a vehicle in such a manner that the plane of movement of the cutting member 2 becomes substantially horizontal. The apparatus is secured to the outer end of a crane beam 10 suitably composed by two or more pivotably interconnected sections and having its inner end carried by a device mounted on top of the roof of the driver's cabin.

Figure 3:
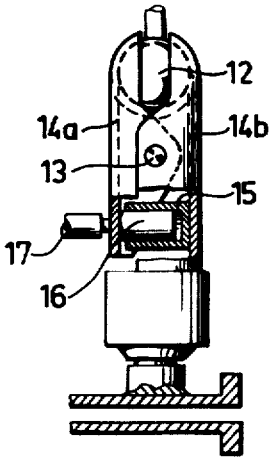
FIG. 3 is a partial sectional view showing on a larger scale the mounting device of the apparatus shown in FIG. 2.

The cutting apparatus shown in FIG. 2 is suspended *at its center of gravity,* from beam 10 [in its center of gravity]. Thanks to that construction the cutting member will automatically assume a horizontal position in the absence of any external forces. However, sometimes it is advantageous that the apparatus can be positively forced into its operational position when passing bushes and similar minor vegetation. This can be achieved by means of some suitable locking device mounted between the cutting apparatus and the crane beam 10. FIG. 3 shows such an interconnecting device comprising a ball 12 mounted at the outer end of beam 10 and forming a ball-joint together with two levers 14a and 14b, the top ends of which have internal, semi-spherical recesses corresponding to and contacting the ball. Levers 14 are swingable round a pivot 13 below which there is a hydraulic cylinder 15 having a piston 16. When via connection 17 pressure oil is forced into the space at the right-hand side of piston 16, the two levers 14a and 14b will obviously become locked with respect to ball 12.

The two embodiments of the invention above-described and shown on the drawing are only intended to exemplify the broad inventive concept which can in several respects be modified within the scope of the claims. By way of example, it could be mentioned that it is often advantageous to equip both halves of the frame with cutting members. This avoids the risk of the log being otherwise crushed due to the reaction forces from the portion of the frame which does not have any cutter. Moreover, when such an arrangement is used, the dimensions of the apparatus can be reduced both as far as the cutting members proper are concerned as in respect of the hydraulic cylinders. Finally, it should be mentioned that an apparatus designed according to this invention can also be equipped with several cutting members, the planes of movements of which are parallel but not coinciding. These cutting members can be arranged for synchronous operation or, alternatively, have some other pattern of movement. The reaction force above referred to may also be partially absorbed by a chain-like device mounted between the cutting members and yielding contact against all of the corresponding [portion] *portions* of the circumference of the log irrespective of variations in the log diameter and of irregular log cross-section.

What is claimed is:

1. An apparatus for cutting trees, logs and similar objects, comprising *a frame, including a pair of rigid members disposed in a fixed spaced relation with respect to one another,* at least one cutting member *consisting of* [having] *a blade having a cutting edge, and located in a plane passing between said pair of frame members, means mounting each cutting member on said frame comprising* [and controlled by hydraulic power means, characterized therein that each cutting member is mounted in] a link system having two sets of links [and] *each pivotally connected to the cutting member associated therewith* and *the frame and* arranged so that any point on *the cutting edge of the* [its] blade carries out a movement [,] which has a component in the longitudinal direction of said [blade] *cutting edge, said cutting member and frame defining a jaw having an open mount for receiving an article to be severed whereby such article may be inserted into the jaw by relative movement of the cutting apparatus and the article to be severed in a direction perpendicular to the length of the article, said links being disposed so as not to traverse the bight of said jaw and hydraulic power means connected to said cutting member for effecting movement of the same relative to the frame.*

2. An apparatus as claimed in claim 1, characterized [therein] *in* that the cutting member is shaped like an oblong plate, the one end of which is pivotably connected both to said hydraulic power means and to [the] one set of links and the opposite end of which is pivotably connected to the other set of *the* links.

3. An apparatus as claimed in claim 1, characterized [therein] *in* that the said hydraulic power means comprises a hydraulic cylinder mounted for swingable motion in the plane of movement *parallel to that* of the cutting member.

4. An apparatus as claimed in claim 1, characterized *in* [therein] that the portion of the cutting member located *adjacent but spaced from* [immediately inside] the *cutting edge* [blade] has a cross-section which periodically varies in the longitudinal direction of said *cutting edge* [blade] due to the presence of a number of spaced grooves.

[5. An apparatus as claimed in claim 1, characterized therein that it is mounted on a vehicle such as a tractor.]

6. An apparatus for cutting trees, logs and similar objects comprising in combination (a) a frame member consisting of two substantially symmetrical halves that are maintained a fixed distance apart; [,]

(b) a cutting member [that is] disposed in the plane passing between the symmetrical halves of said frame member; [,]

(c) [a] hydraulic power means comprising a cylinder portion and a piston portion [that is attached to one extremity of] *and having* one *of said portions pivotally connected to* said cutting member [,] *and the other* [(d) the cylinder] portion [of said hydraulic power means being] pivotally mounted on said frame member [so that said cylinder portion can swing at least a] *for* limited *swinging movement* [distance] in *a* [the] plane passing between the symmetrical halves of said frame member; [,]

(d) [(e)] a first [pivotable] link having one end *pivotally* attached *to* [adjacent to the same extremity of] said cutting member [to which said piston portion is attached] and the other end *pivotally* [of said link being] attached to said frame member; [,] and (e) [(f)] a second [pivotable] link having one end *pivotally attached* [adjacent] to [the other extremity of] said cutting member and the other end *pivotally* [of said link being] attached to another portion of said frame member.

*7. An apparatus as defined in claim 6 wherein said first link and power means are each pivotally attached to the cutting member adjacent one end thereof and wherein said second link is pivotally attached to the cutting member adjacent the other end thereof.*

*8. An apparatus for cutting trees, logs or the like comprising:*

*(a) a frame including a pair of rigid members disposed in fixed spaced relation with respect to one another;*

*(b) means associated with said frame providing an abutment for an article to be severed during severing thereof;*

*(c) at least one cutting member consisting of a blade having a cutting edge movable relative to said frame in a direction toward and away from said abutment means respectively to sever and receive an article therebetween and located in a plane passing between said pair of rigid frame members;*

*(d) a plurality of links interconnecting said blade and said frame, each of said links being pivotally connected at a pair of selectively spaced positions to said frame and to said cutting member and having the pivots so located that during a cutting operation wherein there is relative movement of said cutting member with respect to said frame, any point on the cutting edge of said cutting member has a component of motion in a direction parallel to the length of the*

*cutting edge, said cutting member, frame and abutment means associated with the frame being so arranged as to provide a jaw having an open mouth whereby an elongated article to be severed and the frame can be moved relative to one another in a direction perpendicular to the length of the article to place the article in the jaw for severing; and*

*(e) power means connected to said frame and said cutting member for selectively moving said cutting member relative thereto.*

*9. An apparatus as defined in claim 8 wherein said frame comprises a pair of similarly oriented plate members disposed in a fixed selected spaced relationship and wherein said cutting member is movable in a plane passing between said plate members.*

*10. An apparatus as defined in claim 8 including means swingably mounting said power means on said frame for movement in a plane parallel to the plane of movement of said cutting member.*

*11. An apparatus as defined in claim 8 wherein said frame comprises a pair of similarly oriented plate members disposed in fixed selected spaced relationship and including means swingably mounting said power means on said frame for movement in a plane parallel to the plane of movement of said cutting member.*

*12. An apparatus as defined in claim 8 including a plurality of grooves in said cutting member disposed adjacent and substantially normal to the length of the cutting edge thereof at a position adjacent but spaced therefrom whereby a portion of the cutting member adjacent the cutting edge has a cross-section which periodically varies in thickness throughout its longitudinal extent.*

*13. Mobile tree cutting apparatus comprising:*

*(a) a mobile, self-propelled vehicle;*

*(b) an extendible and retractable boom pivotally mounted on said vehicle to slew about a vertical axis; and*

*(c) cutting means attached to said boom, said cutting means comprising a frame including a pair of rigid members disposed in fixed spaced relation with respect to one another, means associated with said frame providing an abutment for an article to be severed during severing thereof, at least one cutting member consisting of a blade having a cutting edge movable relative to said frame in a direction toward and away from said abutment means respectively to sever and receive an article therebetween and located in a plane passing between said pair of rigid frame members, a plurality of links interconnecting said blade and said frame, each of said links being pivotally connected at a pair of selectively spaced positions to said frame and to said cutting member and having the pivots so located that during a cutting operation wherein there is relative movement of said cutting members with respect to said frame, any point on the cutting edge of said cutting member has a component of motion in a direction parallel to the length of the cutting edge, said cutting member, frame and abutment means associated with the frame being so arranged as to provide a jaw having an open mouth whereby an elongated article to be severed and the frame can be moved relative to one another in a direction perpendicular to the length of the article to place the article in the jaw for severing, and power means connected to said frame and said cutting member for selectively moving said cutting member relative thereto.*

*14. Mobile tree cutting apparatus as defined in claim 13 including a cab on said mobile vehicle providing a protective enclosure for the operator thereof and means pivotally mounting the boom on the roof of the cab for movement about a vertical axis.*

*15. Mobile tree cutting apparatus as defined in claim 13 wherein said cutting apparatus is suspended, at its center of gravity, from the free end of the boom whereby the cutting member, at a normal rest position, assumes a horizontal attitude for cutting standing trees.*

*16. Mobile tree cutting apparatus as defined in claim 15 wherein said cutting apparatus is freely suspended and including lock means for restraining relative movement of cutting apparatus and the section of the boom from which it is suspended.*

*17. Apparatus for cutting trees, logs and similar objects comprising:*

*(a) a frame;*

*(b) at least one cutting member consisting of a blade mounted on said frame;*

*(c) a link system interconnecting each said cutting member and said frame comprising at least two link members each pivotally connected at a pair of spaced positions respectively to said frame and to a respective cutting member imparting compound motion to the latter during movement thereof, said links being so arranged that any point on said cutting member during severing of an article has a component of motion in the longitudinal direction of the cutting edge associated therewith; and*

*(d) power means connected respectively to each said cutting member and said frame for controllably moving each cutting member relative to said frame and means mounting the same on the frame for swinging movement in a plane parallel to the plane of movement of each said cutting member.*

*18. An apparatus for cutting trees, logs and similar objects comprising:*

*(a) a frame including a pair of rigid members in fixed spaced relation with respect to one another;*

*(b) at least one cutting member consisting of a blade having a cutting edge located in a plane passing between said rigid frame members;*

*(c) a link system interconnecting said cutting member and said frame comprising at least two link members each pivotally connected at a pair of spaced positions respectively to said frame and to said cutting member, said pivotal connectins of the links to the cutting member being located behind the cutting edge with reference to the direction of travel thereof during severing of an article; and*

*(d) power means connected respectively to each of said cutting member and frame for controllably moving said cutting member relative to the frame.*

*19. An apparatus for cutting trees, logs and similar objects comprising in combination:*

*(a) a frame member consisting of two substantially symmetrical halves that are maintained a fixed distance apart;*

*(b) a cutting member disposed in the plane passing between the symmetrical halves of said frame member;*

*(c) hydraulic power means comprising a cylinder portion and a piston portion and having one of said portions pivotally connected to said cutting member and the other portion pivotally mounted on said frame member;*

*(d) a first link having one end pivotally attached to said cutting member and the other end pivotally attached to said frame member; and*

*(e) a second link having one end pivotally attached to said cutting member and the other end pivotally attached to another portion of said frame member.*

*20. Apparatus for cutting trees, logs and similar objects comprising:*

*(a) a frame;*

*(b) at least one cutting member consisting of a blade having a cutting edge mounted on said frame;*

*(c) a link system interconnecting each cutting member and said frame producing compound motion of each respective cutting member during movement thereof relative to the frame and comprising at least two members each pivotally connected at a pair of spaced*

*positions respectively to said frame and to a respective cutting member, said links each comprising a pair of members located one on each side of a common side of the frame and the cutting member associated therewith; and*

(*d*) *power means connected respectively to each said cutting member and said frame for controllably moving each cutting member relative to the frame in a direction toward and away from one another.*

*21. A mobile apparatus for cutting trees comprising a mobile vehicle, an extendible and retractable boom pivotally mounted on said vehicle to slew about a vertical axis and a tree cutting apparatus attached to said extendible and retractable boom, said cutting apparatus comprising a frame including a pair of rigid members disposed in fixed spaced relation with respect to one another, at least one cutting member consisting of a blade having a cutting edge and located in a plane passing between said pair of frame members, means mounting each cutting member on said frame comprising a link system having two sets of links each pivotally connected to the cutting member associated therewith and the frame arranged so that any point on the cutting edge of the blade carries out a movement, which has a component in the longitudinal direction of said cutting edge, said cutting member and frame defining a jaw having an open mouth for receiving an article to be severed whereby such article may be inserted*

*into the jaw by relative movement of the cutting apparatus and the article to be severed in a direction perpendicular to the length of the article, said links being disposed so as not to traverse the bight of said jaw and hydraulic power means connected to said cutting member for effecting movement of the same relative to the frame.*

References Cited

The following references, cited by the Examiner, are of record in the patented file of this patent or the original patent.

UNITED STATES PATENTS

| | | | |
|---|---|---|---|
| 344,234 | 6/1886 | Barrick | 145—33 |
| 3,183,953 | 5/1965 | MacMillan et al. | 144—34 |
| 2,631,369 | 3/1953 | Carnesecca | 30—228 |
| 2,528,815 | 11/1950 | Boyer | 30—181 XR |
| 2,565,252 | 8/1951 | McFaull | 144—34 |
| 1,716,991 | 6/1929 | Turner | 83—694 |

FOREIGN PATENTS

| | | |
|---|---|---|
| 108,183 | 8/1943 | Sweden. |

FRANCIS S. HUSAR, Primary Examiner

U.S. Cl. X.R.

30—181, 228; 83—646, 694; 144—2